United States Patent
Shinbori et al.

[11] Patent Number: 5,575,449
[45] Date of Patent: Nov. 19, 1996

[54] SLIDE RAIL DEVICE FOR SEAT

[75] Inventors: Hideo Shinbori; Takuro Takayama; Masami Akiyama, all of Akishima, Japan

[73] Assignee: Tachi-S Co., Ltd., Tokyo, Japan

[21] Appl. No.: 318,294

[22] Filed: Oct. 5, 1994

[30] Foreign Application Priority Data

Oct. 13, 1993 [JP] Japan ................. 5-60003

[51] Int. Cl.⁶ .................................. B60N 1/00
[52] U.S. Cl. ............................ 248/429; 297/344.1
[58] Field of Search ................... 248/429, 430, 248/298; 297/344.1, 470, 473; 280/804

[56] References Cited

U.S. PATENT DOCUMENTS

| | | | |
|---|---|---|---|
| 3,727,977 | 4/1973 | Gmeiner | 297/473 X |
| 4,516,811 | 5/1985 | Akiyama et al. | |
| 4,818,022 | 4/1989 | Nishimura | 297/470 X |
| 4,828,214 | 5/1989 | Kanai et al. | 297/344.1 X |
| 4,940,285 | 7/1990 | Suzuki et al. | 297/473 |
| 5,137,244 | 8/1992 | Negi | 248/429 X |
| 5,167,393 | 12/1992 | Hayakawa et al. | 297/344.1 X |
| 5,301,914 | 4/1994 | Yoshida et al. | |

FOREIGN PATENT DOCUMENTS

| | | | |
|---|---|---|---|
| 3226932 | 1/1984 | Germany | 297/473 |
| 53-94217 | 8/1978 | Japan . | |
| 57-120352 | 7/1982 | Japan . | |
| 95/01888 | 1/1995 | WIPO | 248/429 |

Primary Examiner—Ramon O. Ramirez
Assistant Examiner—Derek J. Berger
Attorney, Agent, or Firm—Browdy and Neimark

[57] ABSTRACT

A slide rail device for a seat, of the type mounted laterally of a seat cushion frame, which comprises an upper rail member fixed to the lateral side of the seat cushion frame, a lower rail member fixed to a floor, a seat belt anchor provided between the upper and lower rail members, and an engagement element. When a great degree of inwardly slant upward pulling force is applied via the seat belt anchor to the upper rail member, the engagement element effects an engagement action in response to at least one of upward and inward component forces composed by such inwardly slant upward pulling force, so that an intensive stress produced between the upper and lower rail members may be dispersed to the engagement element. Further, the upper and lower rail members are formed from a lightweight material with a reinforcing element to have a lightweight yet robust structure.

10 Claims, 4 Drawing Sheets

SLIDE RAIL DEVICE FOR SEAT

BACKGROUND OF INVENTION

1. Field of the Invention

The present invention relates to a slide rail device for a seat including an automotive seat which is operable to adjust the position of the seat in the fore-and-aft direction, and is particularly directed to a slide rail device of the type mounted laterally of a seat frame together with a seat belt anchor member.

2. Description of Prior Art

In most instances, an automotive seat is supported via a slide rail device upon the floor of an automobile permitting its position to be adjusted in the fore-and-aft direction. In particular, among various slide rail devices, a vertical type of slide rail device is known wherein upper and lower rail members are slidably fitted together in an upright or vertical fashion to permit them to be easily mounted to one lateral wall of a seat cushion frame.

Reference is made to FIG. 1 which shows a typical conventional vertical type of seat rail device (110) mounted laterally of a seat cushion frame (116) which forms a part of a seat (not shown). According thereto, an upper rail member (118) has an upper engagement part (128) and a lower engagement part (129), whereas a lower rail member (114) has an upwardly projected engagement part (124) and a downwardly projected engagement part (125). As shown, the upper and lower engagement parts (124)(125) of the lower rail member (114) are respectively slidably engaged in the upwardly and downwardly projected engagement parts (124)(125) via upper and lower sliders (120)(121).

The lower rail member (114) is fixed at its lower end side to the floor (F) of an automobile. The upper rail member (118) is fixed at its vertical lateral side to the lateral wall of seat cushion frame (116), with a seat belt anchor (132) sandwiched therebetween. The seat belt anchor (132) has a belt socket (BS) into which a knuckle of seat belt is to be engaged.

In such an emergency case as a sudden deceleration or collision, a great load (i.e. pulling force) is applied from an occupant sitting on the seat, via the seat belt, to both of the slide rail device (110) and seat belt anchor (132). In this case, the load is dispersed there, exerting an approx. 45-degree upwardly slant forward force (not shown) and approx. 15-degree inwardly slant force (Z) upon the seat belt anchor (132), and further such inwardly slant component force (Z) applies a vertically upward and horizontally inward component forces (X)(Y) to the slide rail device (110).

Against this emergency case, the present conventional slide rail (110) is provided with a lock section (114a) at the lower end thereof. Namely, the lock section (114a) is formed by a pair of vertically opposed lock lugs (136) (138), each extending continuously from the lower engagement part (129) of the upper rail member (128), and an upturned lock lug (138) extending continuously from the lower end of the lower rail member (114). With this structure, in a collision case or the like, the above-discussed component forces (X)(Y)(Z) are produced to forcibly engage the two lock lugs (136)(138) with the lower engagement part (125) and upturned lock lug (138), respectively, thereby locking both upper and lower rail members (128)(114) against their separation.

However, such conventional construction of slide rail device (110) has been found defective in that, as understandable from FIG. 1, a spot where a stress is created most intensively from the two component forces (X)(Y) is the base area of the lower engagement part (125) which is threfore prone to deformation, thus inevitably requiring a special design to give a sufficient strength to that lower engagement part (125). Further, the upturned lock lug (138) produces a most intensive stress from the horizontally inward component force (Y), which is also prone to deformation, requiring a sufficient strength thereto.

One can contemplate on adding a separate reinforcing member to those week spots, and in fact, the same reinforcing process has been done in most of known slide rail devices. But, this results in increasing the number of parts and making complicated the seat assembling steps, which is undesirable because it is very troublesome to workers.

SUMMARY OF THE INVENTION

In view of the above-stated drawbacks, it is a primary purpose of the present invention to provide an improved slide rail device for a seat, which is of a structure sufficient to resist a pulling force applied thereto via a seat belt anchor and disperse a stress created thereby.

In order to achieve such purpose, a slide rail device of such a type mounted laterally of a seat cushion frame, in accordance with the present invention, basically, comprises:

- a lower rail means fixed to a floor, which includes an upper guide groove and a lower guide groove;
- an upper rail means fixed to a lateral side of of the seat cushion frame, the upper rail means being slidably assembled with the lower rail means such as to be slidable along the lower rail means;
- the upper rail means including an upper guide means and a lower guide means which are respectively slidably fitted in the upper and lower guide grooves of the lower rail means via slider means;
- a seat belt anchor means disposed between the upper rail means and the seat cushion frame; and
- at least two engagement means which are so arranged between those upper and lower rail means that each of the engagement means are to effect an engagement action in response to at least one of an upward component force and inward component force composed by an inwardly slant upward force which is applied through the seat belt anchor to the upper rail member in a slant direction inwardly of the seat, producing thus a stress in the upper and lower guide means of the upper rail member, whereby the engagement action of the two engagement means disperses such stress.

Preferably, the foregoing engagement means may comprise: a first engagement means defined between the upper and lower rail means, which is disposed at a point outwardly of the upper guide means and is to effect an engagement action in response to at least one of the upward and inward component forces; and a second engagement means defined between the upper and lower rail means, which is disposed at a point inwardly of the lower guide means and is to effect an engagement action only in response to said upward component force.

More preferably, such first engagement means may comprises:

- an inwardly projected engagement section which is integrally formed with the upper rail means in vicinity of the upper guide means, such as to be projected in a and lower rail means as to be disposed at a point inwardly of the upper guide means and to effect an engagement action only in response to the upward component force.

It is another purpose of the present invention to make light and robust the foregoing slide rail device.

To this end, both said upper and lower rail means are formed by an extrusion molding from such lightweight material as an aluminium alloy, a magnesium alloy and a fiber reinforced plastics, and a reinforcing means is provided at a point where the upper rail means is fixed via the seat belt anchor to the lateral side of the seat cushion frame and also provided at a base portion of the lower rail mans fixed to the floor. As a preferred mode of such reinforcing means, it may be arranged such that all those upper rail means, seat belt anchor and seat cushion frame are fixed firmly together by means of a hard steel plate and at least two bolts, with the hard steel plate being juxtaposed with the upper rail means, and that the base portion of lower rail means is fixed via a leg member to the floor, and the reinforcing means comprises: a generally tubular configuration of the base portion of the lower rail means having a hollow defined therein; a hard steel plate; and at least two bolts, such that the generally tubular configuration of lower rail means base portion is fixed to the leg member by means of the hard steel plate and bolts, with the hard steel plate placed in the hollow of that base portion.

Other features and advantages of the present invention will become apparent from reading of the descriptions hereinafter, with reference to the drawings.

DETAILED DESCRIPTION OF PREFFERED EMBODIMENTS OF THE INVENTION

Figure 1:
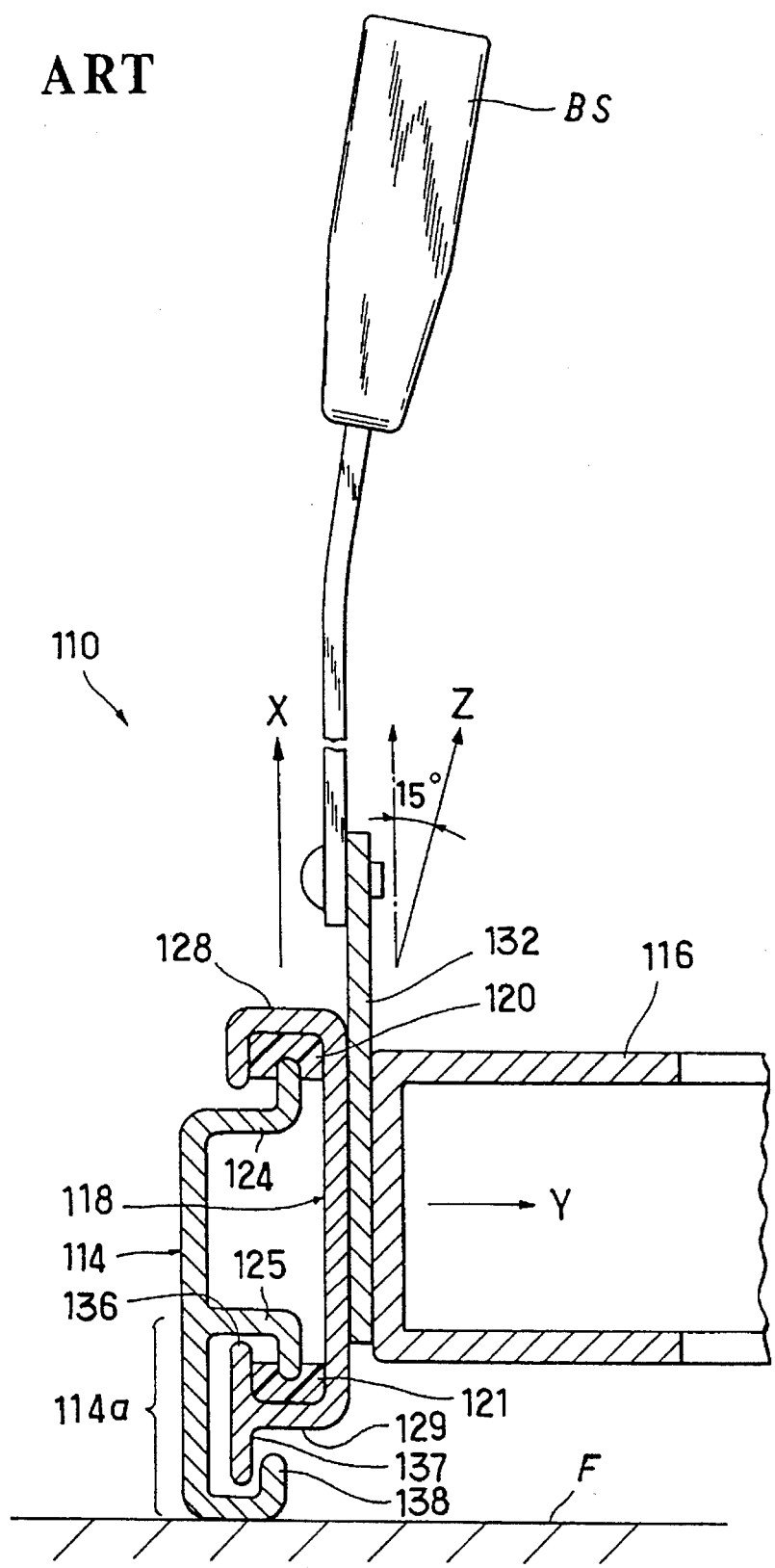
FIG. 1 is a partly broken, longitudinally sectional view of a conventional seat slide rail device for a seat with a seat belt anchor.
Figure 2:
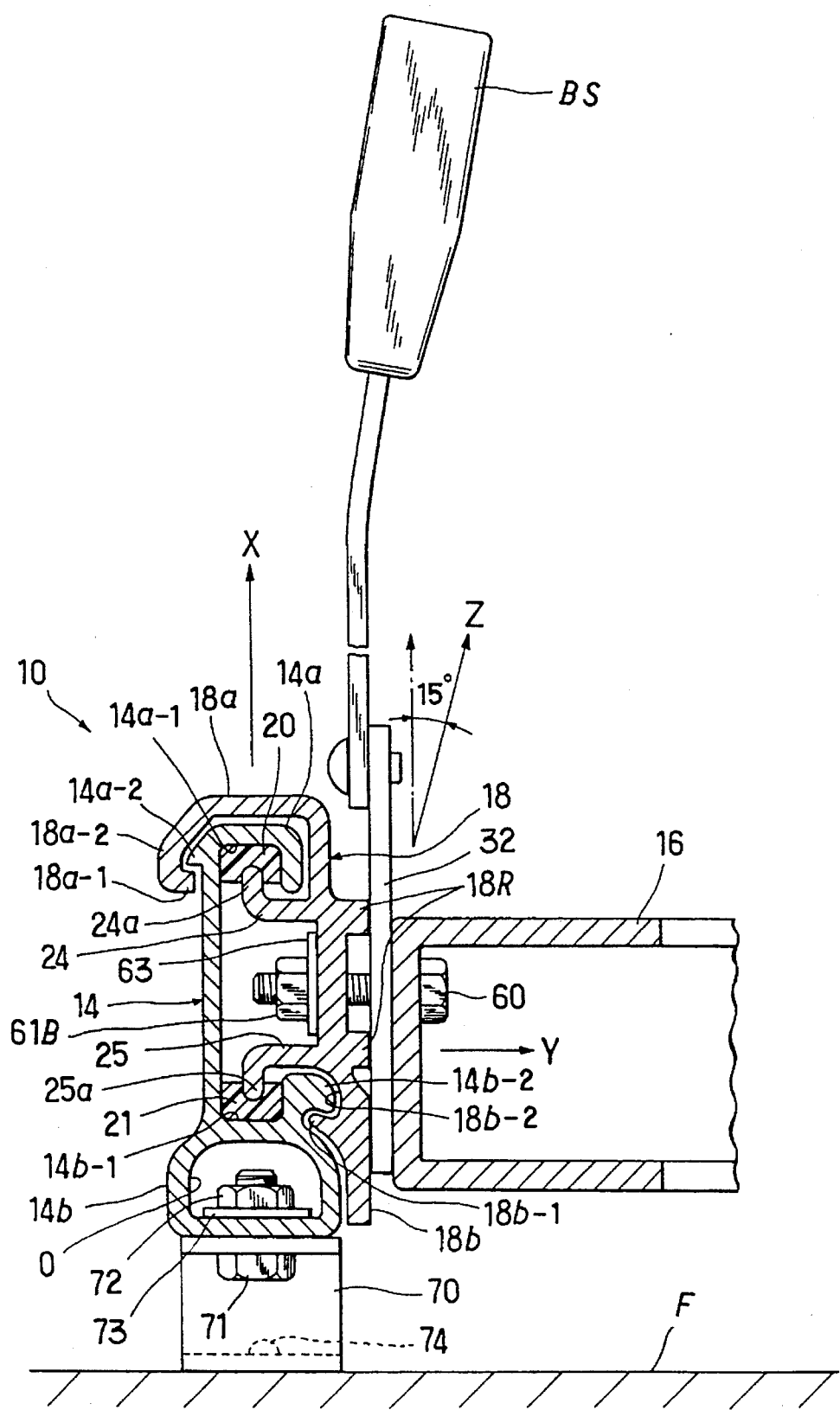
FIG. 2 is a partly broken, longitudinally sectional view of a seat slide device for a seat with a seat belt anchor in accordance with the present invention.
Figure 3:
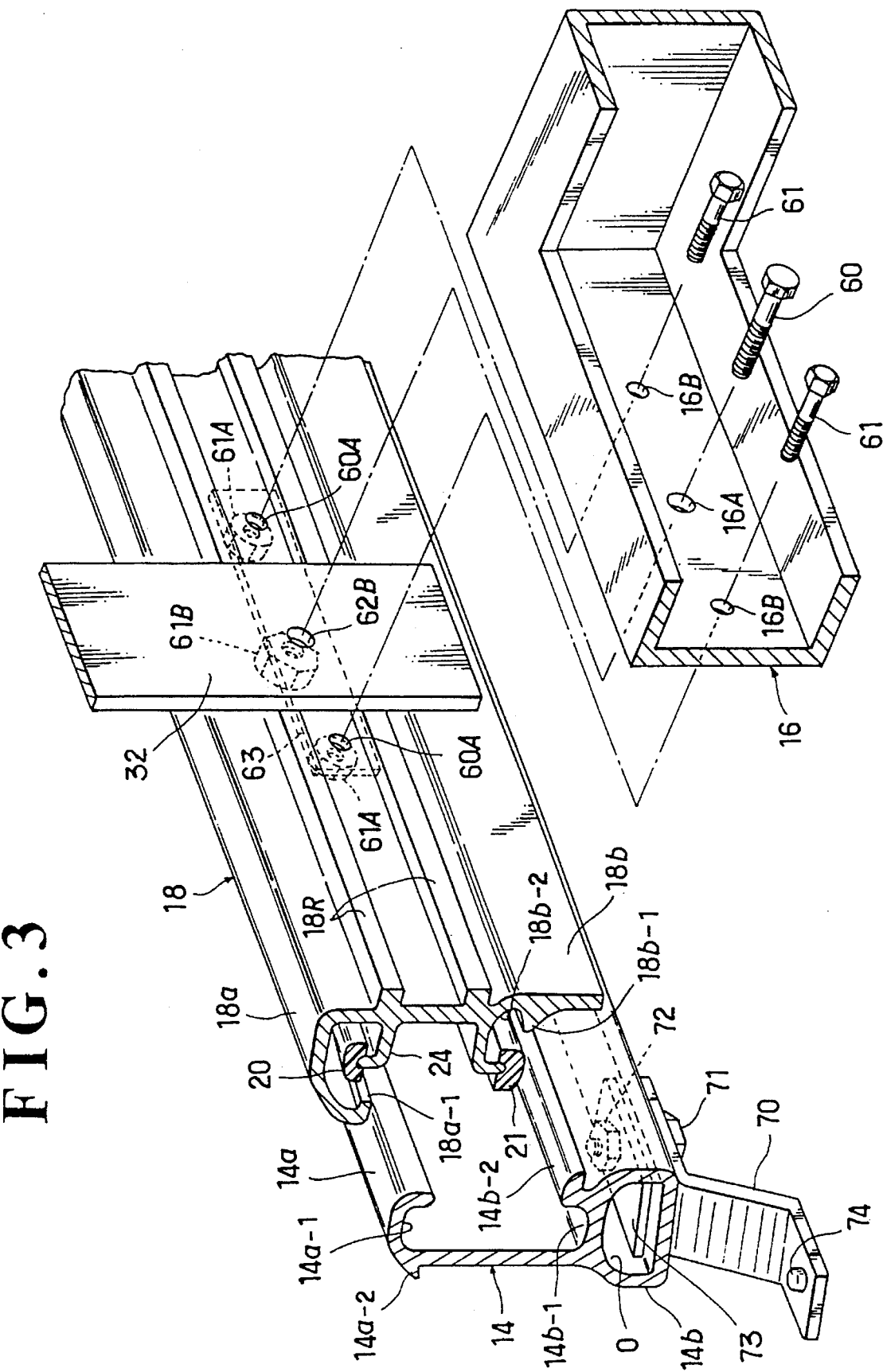
FIG. 3 is a partly broken, exploded schematic perspective view of the seat slide device in accordance with the present invention.

Referring to FIGS. 2 and 3, there is illustrated one preferred embodiment of a slide rail device for a seat by the designation of (10).

The slide rail device (10) is basically comprised of a lower rail member (14) fixed via a leg member (70) to the floor of an automobile, and an upper rail member (18) fixed to the lateral wall of a seat cushion frame (16).

In accordance with the present invention, both upper and lower rail members (18)(14) are formed by extrusion molding into the illustrated configurations, from such lightweight material as an aluminium alloy, magnesium alloy or fiber reinforced plastics (F.R.P.) for the purpose of reducing the weight of the slide rail device (10).

Basically, as in FIG. 2, the lower rail member (14) is formed by such extrusion molding in a generally "C" cross-sectional configuration, having an upper longitudinal guide groove (14a-1) and a lower longitudinal guide groove (14b-1) defined therein, while on the other hand, the upper rail member (18) is formed in a generally reversed-C-shaped cross-sectional configuration, having an upper longitudinal guide section (24) and a lower longitudinal guide section (25), which extend outwardly and terminate in an upwardly turned end (24a) and a downwardly turned end (25a), respectively. Those upper and lower guide sections (24)(25) are engaged slidably at their respective turned ends (24a)(25a) in the upper and lower guide grooves (14a-1)(14b-1) via upper and lower sliders (20)(21), respectively. The upper and lower sliders (20)(21) are formed from polypropylene, and fixed along the upwardly and downwardly turned ends (24a)(25a), respectively.

A seat belt anchor (32) is sandwiched fast between the upper rail member (18) and the lateral wall of the seat cushion frame (16).

In accordance with the present invention, in view of both upper and lower rail members (18)(14) being not so rigid because of its lightweight material mentioned above, it is specially arranged, as shown in FIGS. 2 and 3, such that the lower base portion (14b) of the lower rail member (14) is of a generally tubular structure having a hollow (O) formed therein, to thereby offer a more improved lightweight yet robust structure at the bottom side of the lower rail member (14), and in addition thereto, the securing area within such hollow (O) of lower rail member (14), to which is secured the upper end of leg member (70) by a bolt (71) for fixing the lower rail member (14) to the floor (F), is provided with a hard steel plate (73) with a nut (71) integrally formed thereon, hence giving a reinforcement thereto against deformation or breakage. Moreover, the upper rail member (18) is also of such reinforcing arrangement that a pair of spaced-apart ribs (18R)(18R) are formed in the inward surface of vertical wall section of upper rail member (18), extending along the longitudinal direction thereof, and that a hard steel plate (63) with three nuts (61A)(61B)(61A) integrally formed thereon is provided, as a reinforcement means like the foregoing steel plate (73), at the outward surface of vertical wall section of upper rail member (18). In the upper rail member (18), such reinforcing plate (63) is disposed at a point where the seat belt anchor (32) is sandwiched between the upper rail member (18) and seat cushion frame (16). As best seen in FIG. 3, the inward surface of the upper rail member vertical wall section is formed with three holes as assumable by the designations (60A)(60A) (because another hole is hidden behind the hole (62B) of the seat belt anchor (32)), whereas the lateral wall of seat cushion frame (16) facing towards that inward surface of upper rail member vertical wall section is also formed with three holes (16B)(16A) (16B). All those holes (61A, 61B, 60A, 62B, 16A, 16B) are spaced apart from one another at the same interval so that they are aligned with one another. Therefore, the upper rail member (18) is fixedly secured to the seat cushion frame (16) by inserting three bolts (61)(60)(61) through the respective thus-aligned three pairs of holes (60A, 16B), (62B, 16A) and (60A, 16B) and fixed in the respective three nuts (61A)(61B)(61A). In that way, according to the invention, the reinforcing plates (73)(63) are provided at the aforementioned two securing points, namely, for securing the leg member (70) to the lower rail member (14) and for securing the seat belt anchor (32) and seat cushion frame (16) to the upper rail member (18), so as to add a proper strength to the non-rigid property of the lower and upper rail frames (14)(18), sufficient to protect them against deformation or damages that might occur during a long time of use and in a collision case or so.

As discussed in the description of prior art, it is the case, concerning a load applied to a seat belt in a collision case or so, that an inwardly slant upward pulling force (Z) is imparted through the seat belt anchor (32) to exert a great pulling force to the slide rail device (10) in a direction inwardly of the slide rail device towards the seat cushion frame (16) at the angle of approx. 15 degrees in relation to a vertical line. Dynamically, this inwardly slant upward force (Z) is a resultant force composed of an vertically upward component force (X) and a horizontally inward component force (Y). In the case of embodiment shown in FIG. 2, it is thought that both of those two component forces (X)(Y) will be exerted mainly upon the upper guide section (24) of upper rail member (18), but in particular, the same guide section (24) will directly be applied the vertically upward component force (X), with the result that an intensive stress would be produced in the base area of the upper guide section (24). On the other hand, the lower guide section (25) of upper rail member (18) will be applied the horizontally inward component force (Y), but by the reason of the 15-degree inwardly slant upward resultant force (Z), the amount of such horizontally inward component force (Y) is not so great to the lower guide section (25), thus producing a relatively small stress therein.

From this dynamical viewpoint, according to the present invention, an integral engagement means is defined at two points between the lower and upper rail members (14) (18) in order to disperse the intensive stress in the upper guide section (24).

Specifically, as shown in FIGS. 2 and 3, a first engagement means is integrally defined outwardly of and at the top portion of both lower and upper rail members (14)(18), which comprises an outwardly projected hook-like engagement section (14a-2) formed integrally with the outward upper end corner of the lower rail member (14), and an inwardly projected hook-like engagement section (18a-1) formed integrally with the upper portion (18a) of upper rail member (18) overlaying the upper portion (14a) of lower rail member (14). Designation (18a-2) denotes a downwardly curved portion defined between the upper portion (18a) and inwardly projected hook-like engagement section (18a-1), extending along the outwardly projected hook-like engagement section (14a-2). Normally, the two hook-like engagement sections (14a-2)(18a-1) are spaced apart from each other with a small clearance therebetween, avoiding interference with the sliding motion of the upper rail member (18) along the lower rail member (14). With this arrangement, at least one of the above-stated vertically upward and horizontally inward component forces (X)(Y) applied to the slide rail device (10) immediately brings the inwardly projected hook-like engagement section (18a-1) to a firm engagement with the outwardly projected hook-like engagement section (14a-2).

Further, a second engagement means is integrally defined inwardly of and at the lower portion of both lower and upper rail members (14)(18), which comprises an inwardly projected hook-like engagement section (14b-2) formed integrally with the lower base portion (14b) of lower rail member (14), and an outwardly projected hook-like engagement section (18b-1) integrally with the lower end portion (18b) of upper rail member (18). Designation (18b-2) denotes an inwardly recessed part which is so formed in the vertical wall of upper rail member (18) as to accommodate the inwardly projected hook-like engagement section (14b-2) without contact therewith. Normally, the two hook-like engagement sections (14b-2)(18b-1) are spaced apart from each other with a small clearance therebetween, avoiding interference with the sliding motion of the upper rail member (18) along the lower rail member (14). This second engagement means is designed to only receive the vertically upward component force (X) on the basis of the above-discussed dynamics, so that such upward component force (X) applied to the slide rail device (10) immediately brings the outwardly projected hook-like engagement section (18b-1) to a firm engagement with the inwardly projected hook-like engagement section (14b-2).

Accordingly, when the inwardly slant upward pulling force (Z) is applied to the slide rail device (10) through the seat belt anchor (32), the upper rail member (18) is pulled upwardly from the lower rail (14), which applies both of the vertically upward and horizontally inward component forces (X)(Y) to the base area of the upper guide sections (24), while applying the horizontally inward component force (Y) to both upper and lower guide sections (24)(25). At this moment, the vertically upward component force (X) produces an intensive stress in that base area of upper guide section (24). However, the upper slide guide section (24) is pressed against the upper slider (20) which is thus resiliently deformed to allow upward movement of the upper rail member (18) with respect to the lower rail member (14), whereby the inwardly and outwardly projected hook-like engagement sections (18a-1)(18b-1) of the upper rail member (18) are immediately brought to engagement with the outwardly and inwardly projected hook-like engagement sections (14a-2) (14b-2), respectively. Thus, the upward component force (X) is received at such two engagement points in addition to the original engagement between the upper guide section (24) and upper guide groove (14a-1), so that the intensive stress is disperesed at those three points. With regard to the horizontally inward component force (Y), it initially produces a stress in the respective upwardly and downwardly turned ends (24a)(25a)) of the upper and lower guide sections (24)(25) as well as in the upper and lower sliders (20)(21). In this respect, those upwardly and downwardly turned ends (24a)(25a) are easy to be deformed by such horizontally inward component force (Y), but the engagement of the foregoing first engagement means, i.e. the engagement of the inwardly projected hook-like engagement section (18a-1) with the outwardly projected hook-like engagement section (14a-2), acts to disperse the stress from those two ends (24a)(25a) to the respective base areas of those particular two hook-like engagement sections (18a-1)(14a-2). Hence, the stress originated from the horizontally inward component force (Y) is dispersed at those three points.

It is therefore appreciated that the above-constructed first and second engagement means (14a-2, 18a-1)(14b-2, 18b-1) function effectively to avoid the creation of intensive stress in one part of the slide rail device (10) and disperse the stress, thereby retaining the respective strengths in the engagement points between the upper and lower rail members (18)(14).

Figure 4:
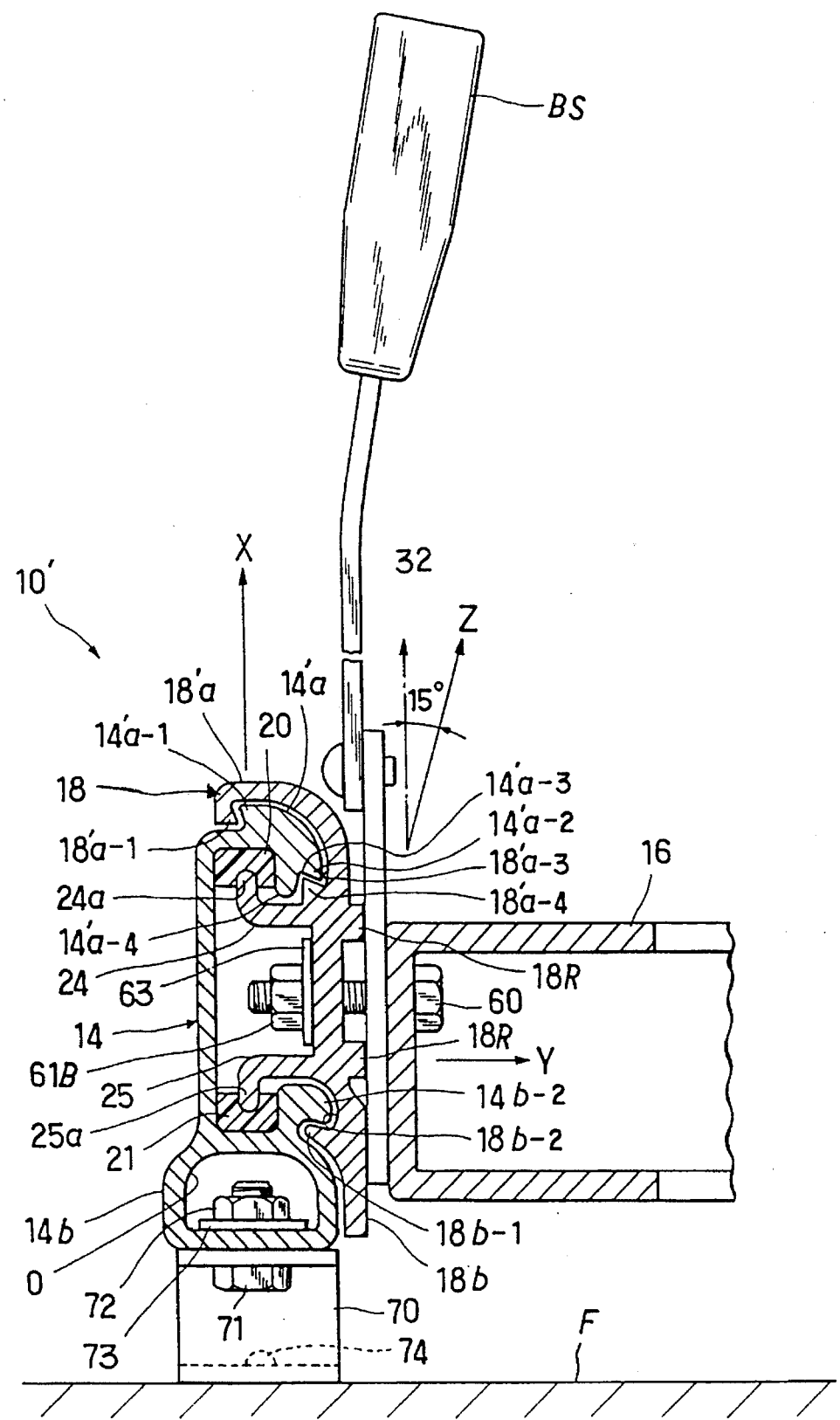
FIG. 4 is a partly broken, longitudinally sectional view of a partly modified mode of the seat slide device in accordance with the present invention.

Reference is made to FIG. 4, which indicates a slight modification in the above-described slide rail device (10) as generally designated by (10'), which is therefore basically identical in structure to that first one (10), except that the first engagement means is embodied by forming a downwardly projected hook-like engagement section (18'a-1) integrally in the upper protion (18'a) of the upper rail member (18) and by forming an upwardly projected hook-like engagement section (14'a-1) integrally in the upper portion of the lower rail member (14). Hence, it should be understood that all like designations in this second mode (10') correspond to all like designations in the above-described first mode (10). Of course, those two hook-like engagement sections (18'a-1)(14'a-1) are normally spaced apart from each other with a small clearance therebetween. It is noted here that the upwardly projected hook-like engagement section (14'a-1) is disposed inwardly of the body of slide rail device (10') and also the downwardly projected hook-like engagement section (18'a-1) does not project outwardly from the vertical wall portion of the lower rail member (14), in contrast to the first engagement means (18a-1)(14a-2) of the first mode of slide rail device (10) which is disposed outwardly of its body as in FIG. 2. This advantageously prevents contact of both hook-like engagement sections (14'a-1)(18'a-1) with a foot of a passenger who climbs onto or descends from a seat mounted on the present slide rail device (10'), thus insuring a safety for the passenger.

As shown in FIG. 4, according to the second mode, in addition to such modified first engagement means (18'a-1)(14'a-1), a third engagement means is defined integrally at the base area of the upper guide section (24) formed in the upper rail member (18) and defined at the upper portion of the lower rail member (14). Namely, such third engagement means is embodied in FIG. 4 by forming a downwardly projected hook-like engagement section (14'a-2) integrally in the upper portion of the lower rail member (14) and by forming an upwardly projected hook-like engagement section (18'a-4) integrally in the base area of the upper guide section (24). Of course, normally, both hook-like engagement sections (14'a-2)(18'a-4) are spaced apart from each other, with a small clearance therebetween.

According to the above-arranged second mode (10'), when the inwardly slant upward pulling force (Z) is applied thereto via the seat belt anchor (32), the downwardly and upwardly projected hook-like engagement sections (18'a-1)(18'a-4) of the upper rail member (18) are respectively brought to engagement with the upwardly and downwardly projected hook-like engagement sections (14'a-1)(14'a-2) of the lower rail member, and at the same time, another upwardly projected hook-like engagement section (18b-1) is brought to engagement with its mating downwardly projected hook-like engagement section (14b-2) as described in the first mode (10), whereby in the vertically upward component force (X), a stress created thereby is dispersed to those three points, preventing an intensive stress from being produced in the base area of the upper guide section (24). In the horizontally inward component force (Y), a stress created thereby is dispersed to the downwardly and upwardly projected hook-like engagement sections (18'a-1)(14'a-1). Accordingly, the present second mode of slide rail device (10') offers a more increased number of spots for dispersing a stress from the two component forces (X)(Y), which tends to be intensively produced in the base area of the upper guide section (24).

It should be understood that, although the descriptions has been made as to only one slide rail device (10 or 10') at one lateral side of the seat cushion frame (16), yet there is provided another slide rail device (not shown) of the same construction therewith at another opposite lateral side of the seat cushion frame (16) so as to provide a pair of slide rail devices, as with most of ordinary paired slide rail devices used in seats.

While having described the present invention, it should also be understood that the invention is not limited to the illustrated embodiments, but other various modifications, replacements and additions may be structurally applied thereto without departing from the scopes of the appended claims. For example, the sliders (20)(21) and all those hook-like engagement sections (14a-1, 14'a-1, 18a-1, 18'a-1, ... ) may be either formed along the whole length of both lower and upper rail members (14)(18), or formed separately at plural points along the two rail members (14)(18). The slide rail device of the present invention may be applied to other sorts of seats, such as the ones used in a train, airplane or ship.

What is claimed is:

1. A slide rail device for a seat, of such a type mounted laterally of a seat cushion frame which forms a part of said seat, comprising:

a lower rail means to be fixed to a floor, said lower rail means including an upper guide groove and a lower guide groove;

an upper rail means to be fixed to a lateral side of said seat cushion frame, said upper rail means being slidably assembled with said lower rail means such as to be slidable along said lower rail means;

said upper rail means including an upper guide means and a lower guide means which are respectively slidably fitted in said upper and lower guide grooves of said lower rail means via slider means;

a seat belt anchor means disposed between said upper rail means and said seat cushion frame; and at least two engagement means which are so arranged between said upper and lower rail means that each of said at least two engagement means to effect an engagement action responsive to an inwardly slant upward force being applied through said seat belt anchor means to said upper rail means in a slant direction inwardly of the seat, whereby said engagement action disperses a stress produced by said inward slant upward force in said upper and lower guide means of said upper rail means, said at least two engagement means including:

(a) a first engagement means disposed at a point laterally away from said seat frame, said first engagement means being to effect an engagement action in response to at least one of an upward component force and an inward component force composed by said inwardly slant upward force; and (b) a second engagement means disposed at a point laterally toward said seat frame and away from said first engagement means said second engagement means being to effect an engagement action only in response to said upward component force.

2. The slide rail device according to claim 1, wherein said first engagement means comprises:

an inwardly projected engagement section which is integrally formed with said upper rail means in a vicinity of said upper guide means, such as to be projected in a direction inwardly of said upper rail means;

an outwardly projected engagement section which is integrally formed with said lower rail means in vicinity of said upper guide means, such as to be projected in a direction outwardly of said lower rail means;

both said inwardly and outwardly projected engagement sections being to be engaged with each other for said engagement action in response to said at least one of upward and inward component forces; and wherein, said second engagement means is disposed at a lower point relative to said first engagement means and comprises:

an outwardly projected engagement section which is integrally formed with said lower rail means such as to be projected outwardly thereof; and an inwardly projected engagement section which is integrally formed with said upper rail means such as to be projected inwardly thereof;

both said outwardly and inwardly engagement sections being engaged with each other for said engagement action only in response to said upward component force.

3. The slide rail device according to claim 1, wherein said at least two engagement means further include a third engagement means in addition to said first and second engagement means, and wherein said third engagement means is so defined between said upper and lower rail means as to be disposed at a inward side of said upper guide means of said upper rail means and laterally away from said seat frame, said third engagement means being to effect an engagement action only in response to said upward component force.

4. The slide rail device according to claim 3, wherein said third engagement means comprises: an outwardly projected engagement section which is integrally formed with said upper rail means in a vicinity of said upper guide means, such as to be projected outwardly of said upper rail means; and an inwardly projected engagement section which is integrally formed with said lower rail means in vicinity of said upper guide means, such as to be projected inwardly of said upper rail means, and wherein both said outwardly and inwardly projected engagement sections are to be engaged with each other only in response to said upward component force.

5. The slide rail device according to claim 1, wherein said lower rail means includes a base end portion of a generally tubular shape having a hollow therein, said base end portion to be fixed to said floor.

6. The slide rail device according to claim 1, wherein both said upper and lower rail means are formed by an extrusion molding from a material selected from the group consisting of aluminium alloy, magnesium alloy and fiber reinforced plastics.

7. A side rail device for a seat, of such a type mounted laterally of a seat cushion frame which forms a part of said seat, comprising
- a lower rail means formed from a lightweight material, said lower rail means to be fixed to a floor and including an upper guide groove and a lower guide groove;
- an upper rail means formed from a lightweight material, said upper rail means to be fixed to a lateral side of said seat cushion frame and being slidably assembled with said lower rail means such as to be slidable along said lower rail means;
- said upper rail means including an upper guide means and a lower guide means which are respectively slidably fitted in said upper and lower guide grooves of said lower rail means via slider means;
- a seat belt anchor means disposed between said upper rail means and said seat cushion frame;
- at least two engagement means which are so arranged integrally between said upper and lower rail means that each of said at least two engagement means effect an engagement action responsive to an inwardly slant upward force being applied through said seat belt anchor means to said upper rail means in a slant direction inwardly of the seat, whereby said engagement action disperses a stress produced by said inward slant upward force in said upper and lower guide means of said upper rail means, said at least two engagement means including:
  (a) a first engagement means disposed at a point laterally away from said seat frame, said first engagement means being to effect an engagement action in response to at least one of an upward component force and an inward component force composed by said inwardly slant upward force; and
  (b) a second engagement means disposed at a point laterally toward said seat frame and from said first engagement means said second engagement means being to effect an engagement action only in response to said upward component force,
- a reinforcing means which is provided at a point where said upper rail means is fixed via said seat belt anchor to the lateral side of said cushion frame and also provided at a base portion of said lower rail mans fixed to said floor.

8. The slide rail device according to claim 7, wherein both said upper and lower rail means are formed by an extrusion molding from said lightweight material, and wherein said lightweight material is a material selected from the group consisting of aluminium alloy, magnesium alloy and fiber reinforced plastics.

9. The slide rail device according to claim 7, wherein said reinforcing means comprises a hard steel plate and at least two bolts, and wherein all said upper rail means, seat belt anchor and seat cushion frame are fixed firmly together by means of said hard steel plate and at least two bolts, with said hard steel plate being juxtaposed with said upper rail means.

10. The slide rail device according to claim 7, wherein said base portion of said lower rail means is fixed to a leg member to be fixed said floor, such that one end of said leg member is fixed to said base portion of said lower rail means while another end of the same leg member is to be fixed to said floor, wherein said reinforcing means comprises: a generally tubular configuration of said base portion of said lower rail means having a hollow defined therein; a hard steel plate; and at least two bolts, and wherein said generally tubular configuration of said lower rail means base portion is fixed to said one end of said leg member by means of said hard steel plate and bolts, with said hard steel plate placed in said hollow of said lower rail means base portion.

* * * * *